United States Patent
Ishihara et al.

(10) Patent No.: US 7,387,034 B2
(45) Date of Patent: Jun. 17, 2008

(54) TORQUE DETECTING APPARATUS

(75) Inventors: Toshiharu Ishihara, Kashiwara (JP);
Taisuke Tsujimoto, Kashiwara (JP);
Naoki Nakane, Toyota (JP)

(73) Assignees: Koyo Seiko Co., Ltd., Osaka (JP);
Favess Co., Ltd., Aichi (JP); Denso Corporation, Aichi (JP)

( * ) Notice: Subject to any disclaimer, the term of this patent is extended or adjusted under 35 U.S.C. 154(b) by 119 days.

(21) Appl. No.: 11/213,032

(22) Filed: Aug. 25, 2005

(65) Prior Publication Data

US 2006/0042405 A1    Mar. 2, 2006

(30) Foreign Application Priority Data

Aug. 27, 2004   (JP)   ............... 2004-248849

(51) Int. Cl.
*G01L 3/10* (2006.01)
(52) U.S. Cl. .................. 73/862.333; 73/862.331; 73/862.321
(58) Field of Classification Search ........... 73/862.333, 73/862.331, 862.321, 862.191, 862.08; 324/207.25
See application file for complete search history.

(56) References Cited

U.S. PATENT DOCUMENTS 6,880,411 B2   4/2005   Nakane et al.

2003/0209087 A1   11/2003   Nakane et al.
2003/0233889 A1   12/2003   Nakane et al.
2005/0067917 A1 *   3/2005   Kastinger et al. ........... 310/257
2005/0264118 A1 *   12/2005   Kascak et al. ............. 310/90.5

FOREIGN PATENT DOCUMENTS

JP   2003-149062 A   5/2003

OTHER PUBLICATIONS

European Search Report dated Mar. 27, 2007 in connection with European Patent Application No. EP 05 10 7865.

* cited by examiner

*Primary Examiner*—Edward Lefkowitz
*Assistant Examiner*—Punam Patel
(74) *Attorney, Agent, or Firm*—Darby & Darby

(57) ABSTRACT

A torque detecting apparatus having a permanent magnet fixed to an input shaft, magnetic yokes fixed to an output shaft coaxially connected to the input shaft via a torsion bar and disposed within a magnetic field of the permanent magnet to form a magnetic circuit, and a Hall IC for detecting a magnetic flux induced by the magnetic yokes. The permanent magnet is of a truncated conical shape, and the bevel circumference surface thereof is magnetized by magnetic poles alternately in a reverse polarities along circumference direction, so as to oppose the magnetic yokes. A torque applied to the input shaft or the output shaft can be detected through detection by the Hall IC of the magnetic flux generated between the magnetic yokes. The configuration allows reducing the length in an axial direction of the input shaft.

2 Claims, 6 Drawing Sheets

TORQUE DETECTING APPARATUS

CROSS-REFERENCE TO RELATED APPLICATIONS

This Nonprovisional application claims priority under 35 U.S.C.§119 (a) on Patent Application No.2004-248849 filed in Japan on Aug. 27, 2004, the entire contents of which are hereby incorporated by reference.

BACKGROUND OF THE INVENTION

1. Field of the Invention

The present invention relates to a torque detecting apparatus suitable for a power steering apparatus of an automobile and the like. More specifically, the present invention relates to a torque detecting apparatus comprising a first shaft and a second shaft coaxially connected to each other via a connecting rod, a permanent magnet fixed to the first shaft, a plurality of soft magnetic materials fixed to the second shaft so as to be disposed within a magnetic field of the permanent magnet thus to form a magnetic circuit, and a sensor for detecting a magnetic flux induced by the magnetic circuit formed by the soft magnetic materials, so that when a torque is applied to the first shaft or the second shaft the torque is detected based on an output of the sensor.

2. Description of the Related Art

Many vehicles are today provided with a power steering apparatus that provides an assisting steering force by an electric motor, thus to relieve a load imposed on the driver in the steering operation. The power steering apparatus comprises an input shaft connected to a steering member (steering wheel), an output shaft connected to a wheel to be steered via, for example, a rack and pinion, and a connecting rod for connecting the input shaft and the output shaft. A steering torque applied to the input shaft is detected by a torque detecting apparatus according to an amount of torsion (specifically an angle) generated on the connecting rod, so that the electric motor for steering assistance interlocked with the output shaft is driven based on the detected steering torque value. In such a torque detecting apparatus of a power steering apparatus, a magnetic detection resolver that detects a rotational position with a coil, or an optical encoder that detects a rotational position by sensing light transmission has been conventionally employed.

Apart from the above, Japanese Patent Application Laid-Open No.2003-149062 proposes a torque sensor (torque detecting apparatus) having a configuration according to a vertical cross-sectional view shown in FIG. 1, which is different from the conventional ones. This torque sensor (torque detecting apparatus) comprises an input shaft 1 and an output shaft 2 coaxially connected to each other via a torsion bar (not shown), a ring-shaped 24-pole permanent magnet 15 fixed to the input shaft 1, two magnetic yokes 4c, 4d respectively constituted of a soft magnetic material, fixed to the output shaft 2 so as to be disposed within a magnetic field of the permanent magnet 15 thus to form a magnetic circuit, two flux condensing rings 8c, 8d magnetically connected to the magnetic yokes 4c, 4d respectively to induce the magnetic flux from the magnetic yokes 4c, 4d, flux condensing portions 19c, 19d respectively provided on the flux condensing rings 8c, 8d so as to condense a magnetic flux induced by the flux condensing rings 8c, 8d, respectively, and a magnetic sensor (Hall IC) 6 that detects a magnetic flux condensed on the flux condensing portions 19c, 19d. With such a torque sensor (torque detecting apparatus), a torque applied to the input shaft 1 can be detected based on an output of the magnetic sensor 6.

In the torque detecting apparatus disclosed in Japanese Patent Application Laid-Open No.2003-149062, the magnetic yokes 4c, 4d have to be disposed so as to receive a certain amount of magnetic flux from the permanent magnet 15. In other words, a certain area has to be ensured to allow the magnetic yokes 4c, 4d and the permanent magnet 15 to oppose each other. This, however, inevitably requires that the permanent magnet 15 has a certain length (height) in an axial direction of the input shaft 1, which inhibits reducing an overall dimension of the torque detecting apparatus in the axial direction of the input shaft 1, thus preventing making the torque detecting apparatus more compact.

BRIEF SUMMARY OF THE INVENTION

The present invention has been conceived in view of the foregoing situation, with an object to provide a torque detecting apparatus having a reduced length in an axial direction of an input shaft, thus to be made smaller in dimensions.

A torque detecting apparatus of the present invention according to the first aspect is a torque detecting apparatus comprising: a permanent magnet fixed to a first shaft; a plurality of soft magnetic materials fixed to a second shaft coaxially connected to the first shaft via a connecting rod and disposed within a magnetic field of the permanent magnet to form a magnetic circuit; and a detector for detecting a magnetic flux generated between the plurality of soft magnetic materials and induced by the plurality of soft magnetic materials when a torque is applied to the first shaft or the second shaft; whereby the torque applied to the first shaft or the second shaft is detected based on the magnetic flux detected by the detector; and is characterized in that the permanent magnet is of a truncated conical shape and coaxially fixed to the first shaft, a bevel circumference surface of the truncated conical shape of the permanent magnet is magnetized by magnetic poles alternately in a reverse polarity along a circumferential direction, and the plurality of soft magnetic materials are opposing the bevel circumference surface of the permanent magnet.

The torque detecting apparatus according to the first aspect of the present invention can have a reduced length in an axial direction of the first shaft and also smaller overall dimensions, and can hence be more easily assembled in a power steering apparatus and so on.

A torque detecting apparatus of the present invention according to the second aspect is based on the first aspect and is characterized by further comprising a plurality of auxiliary soft magnetic materials magnetically connected to the plurality of soft magnetic materials so as to induce a magnetic flux from the plurality of soft magnetic materials, and respectively including a flux condensing portion for condensing the induced magnetic flux, wherein the detector detects the magnetic flux condensed on the flux condensing portion.

In the torque detecting apparatus according to the second aspect of the present invention, the auxiliary soft magnetic materials are simply magnetically connected to the soft magnetic materials. Therefore, in addition to the advantage provided by the first aspect, routing of connection cables and so forth is no longer necessary when assembling the torque detecting apparatus in a rotation shaft of a power steering apparatus, which makes it easier to retrieve a detecting signal and minimizes likelihood of a malfunction due to disconnection of the connection cable or the like.

A torque detecting apparatus of the present invention according to the third aspect is based on the first or second aspect and is characterized in that two of the soft magnetic materials are provided, each of the soft magnetic materials is provided with teeth which are symmetrical with respect to a straight line along an axial direction of the first shaft, the number of the teeth being a half of the number of the magnetic poles magnetized on the bevel circumference surface of the permanent magnet, when torque is not applied to both said first shaft and said second shaft, a center of the respective teeth of one of the soft magnetic materials is positioned on a boundary between an N (or S) pole and an S (or N) pole magnetized on the bevel circumference surface of the permanent magnet, and a center of the respective teeth of the other soft magnetic materials is positioned on a boundary between an S (or N) pole and an N (or S) pole magnetized on the bevel circumference surface of the permanent magnet.

In the torque detecting apparatus according to the third aspect of the present invention, a difference between the magnetic flux coming in from an N pole of the permanent magnet and the magnetic flux going out to an S pole becomes zero at a neutral position on each tooth, even though the ambient temperature varies. Therefore, in addition to the advantage provided by the first and the second aspects, the detection accuracy is not affected by a variation in ambient temperature.

The above and further objects and features of the invention will more fully be apparent from the following detailed description with accompanying drawings.

DETAILED DESCRIPTION OF THE PRESENT INVENTION

Figure 1:
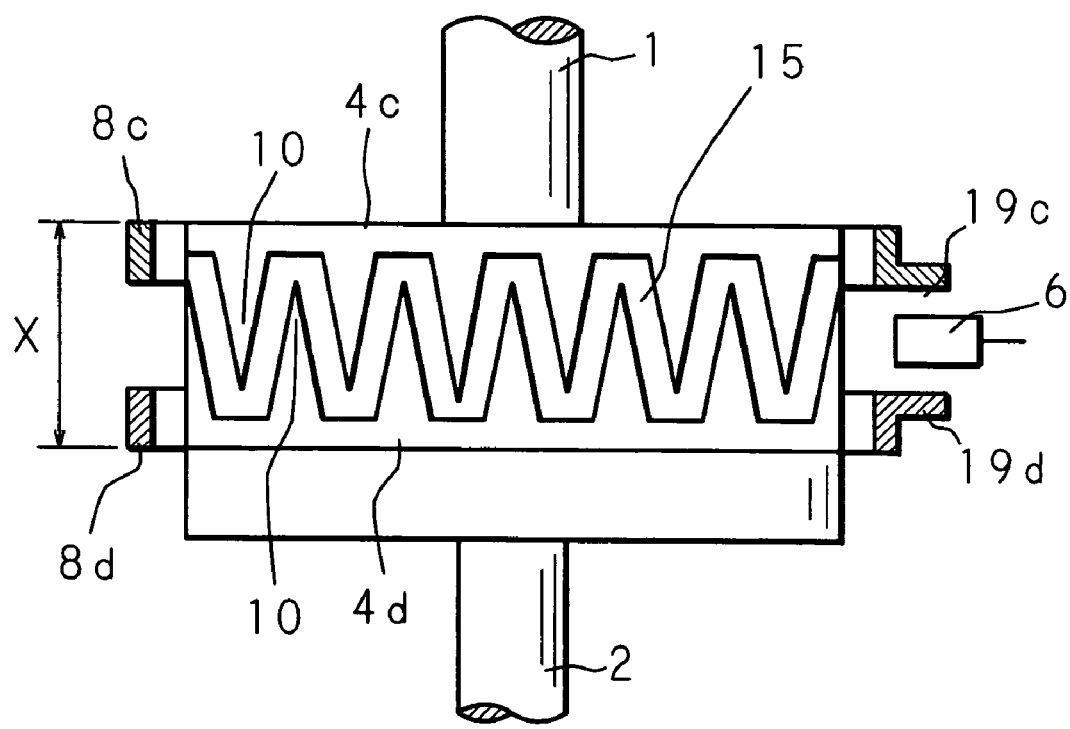
FIG. 1 is a schematic cross-sectional view showing a conventional torque sensor (torque detecting apparatus)

Hereunder, the present invention will be described referring to the drawings showing preferred embodiments thereof.

Figure 2:
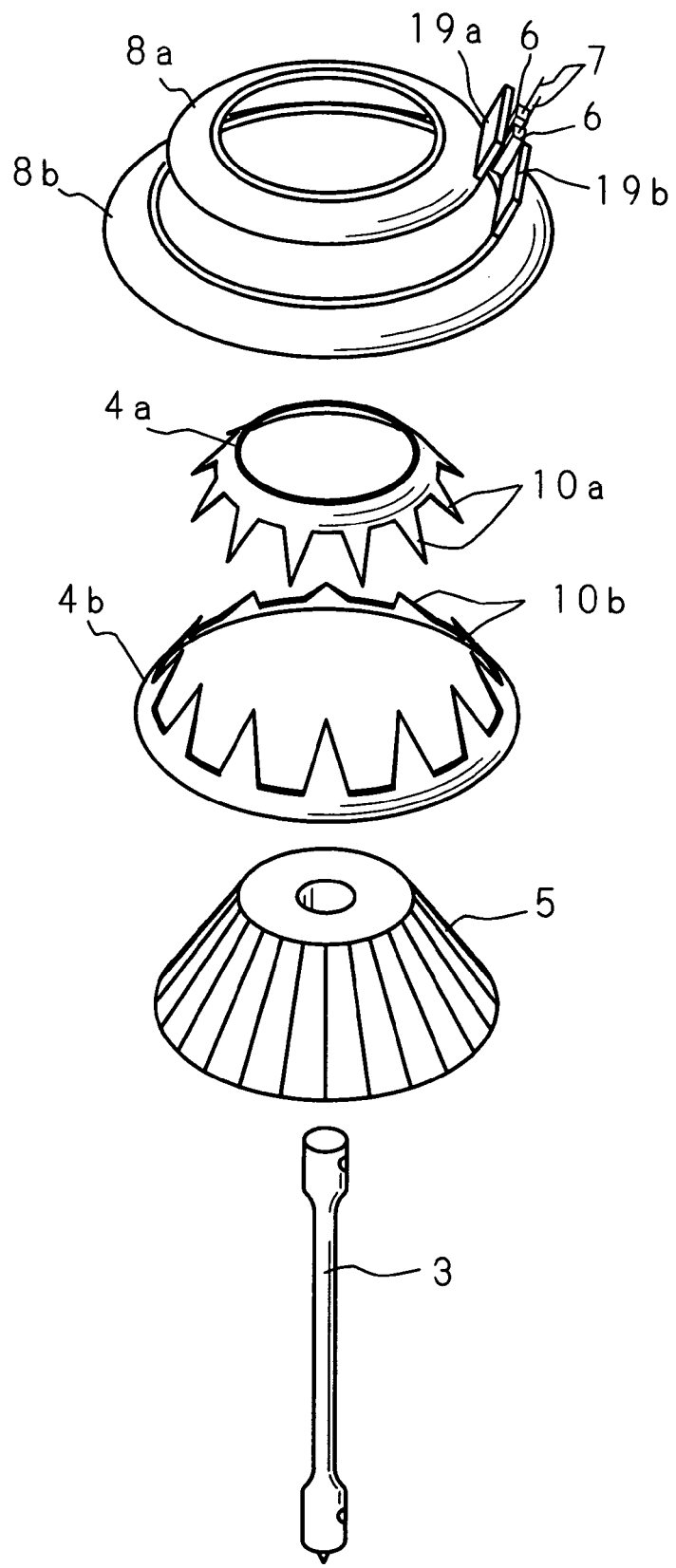
FIG. 2 is an exploded perspective view showing a configuration of a torque detecting apparatus according to the present invention.
Figure 3:
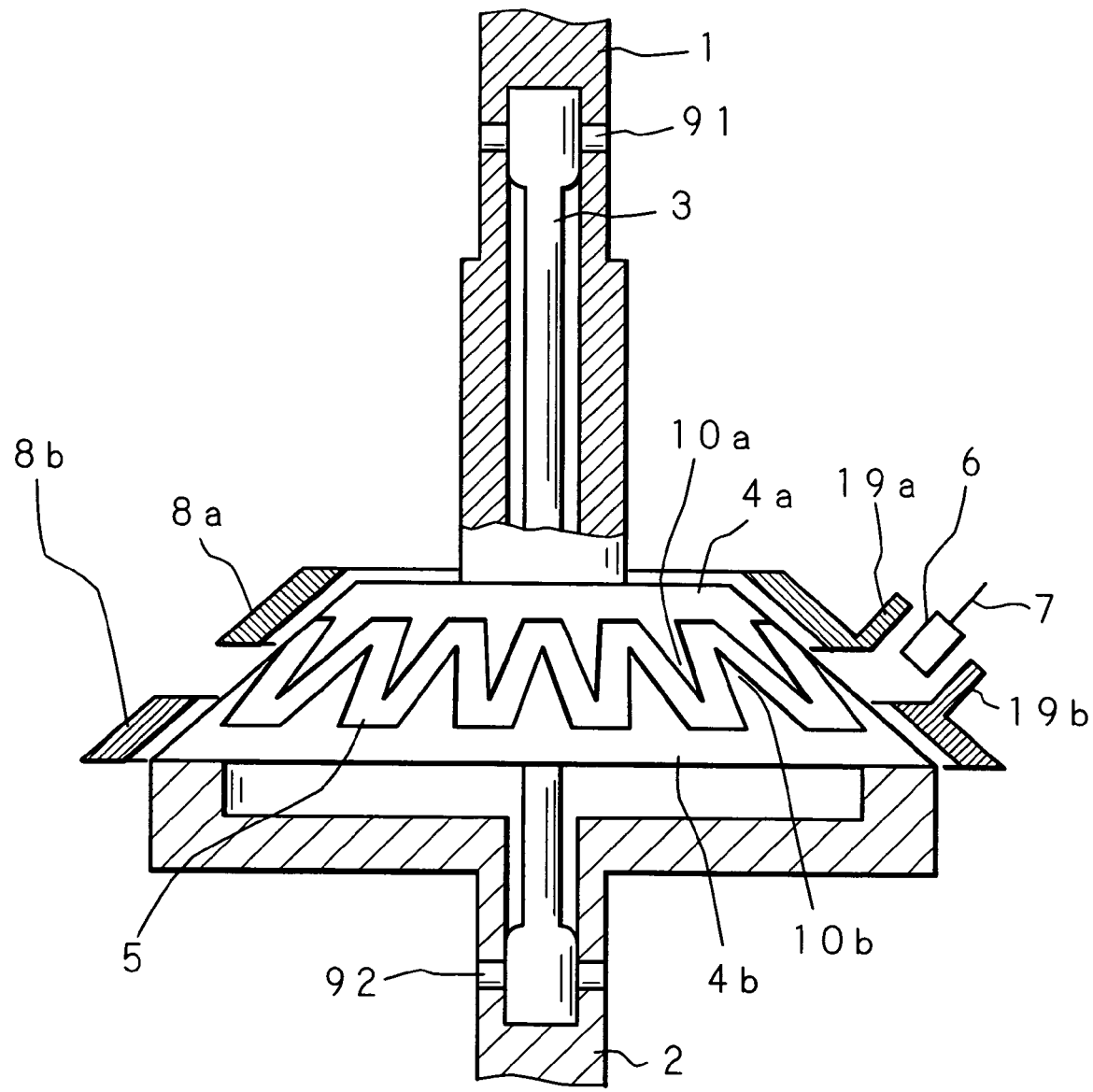
FIG. 3 is a partial vertical cross-sectional view showing the assembled torque detecting apparatus according to the present invention.

FIG. 2 is an exploded perspective view showing a configuration of a torque detecting apparatus according to the present invention. FIG. 3 is a partial vertical cross-sectional view showing the assembled state of the torque detecting apparatus according to the present invention. The torque detecting apparatus according to the present invention is to be mounted on an input shaft 1 as a first shaft and an output shaft 2 as a second shaft, coaxially connected to each other via a torsion bar 3 of a smaller diameter, as a connecting rod. The input shaft 1 is coaxially connected to an end portion of the torsion bar 3 with a pin 91, and the output shaft 2 is coaxially connected to the other end portion of the torsion bar 3 with a pin 92. Accordingly, the input shaft 1 and the output shaft 2 are coaxially connected via the torsion bar 3.

On the end portion of the input shaft 1 on the side of the output shaft 2, a permanent magnet 5 of a truncated conical shape is coaxially fixed, with the larger diameter portion facing the output shaft 2 side and the smaller diameter portion facing the input shaft 1 side. On the bevel circumference surface of the truncated conical-shaped permanent magnet 5, twelve each of N poles and S poles, totally 24 poles, for example, are magnetized at regular intervals along a circumferential direction. The output shaft 2 is provided with a smaller and a larger magnetic yokes 4a, 4b, which are soft magnetic materials, coaxially fixed on the end portion on the side of the input shaft 1. The magnetic yokes 4a, 4b are disposed so as to cover the outer bevel circumference surface of the truncated conical-shaped permanent magnet 5, with an appropriate distance therebetween.

The smaller magnetic yoke 4a is provided so as to cover the permanent magnet 5 from the smaller diameter side toward the larger diameter side, while the larger magnetic yoke 4b is provided so as to cover the permanent magnet 5 from the larger diameter side toward the smaller diameter side. Accordingly, the magnetic yokes 4a, 4b both have a same shape as the bevel circumference surface of the truncated cone. To the smaller magnetic yoke 4a, on a plate member formed in the shape of the bevel circumference surface of the truncated cone, provided are twelve teeth 10a projecting in an isosceles triangular shape toward the larger diameter side of the permanent magnet 5, formed at regular intervals along the bevel circumference surface of the truncated cone. To the larger magnetic yoke 4b, on a plate member formed in the shape of the bevel circumference surface of the truncated cone, provided are twelve teeth 10b projecting in an isosceles triangular shape toward the smaller diameter side of the permanent magnet 5, formed at regular intervals along the bevel circumference surface of the truncated cone. Therefore, the respective teeth 10a, 10b of the magnetic yokes 4a, 4b are formed in symmetrical with respect to a straight line along an axial direction of the input shaft 1. This means that the respective teeth 10a, 10b of the magnetic yokes 4a, 4b do not necessarily have to be of an isosceles triangular shape mentioned above, but may instead be of an isosceles trapezoidal shape, a rectangular shape (including a square), a semicircular shape, a semi elliptical shape and so forth.

The respective teeth 10a of the magnetic yoke 4a and the respective teeth 10b of the magnetic yoke 4b are opposite to each other having an offset of appropriate circumferential interval, more specifically an interval of "360/2n" degrees where "n" is the number of the respective teeth 10a, 10b of the magnetic yokes 4a, 4b, so that the projecting tip of the respective teeth 10a of the magnetic yoke 4a is disposed between two adjacent teeth 10b of the magnetic yoke 4b, and likewise the projecting tip of the respective teeth 10b of the magnetic yoke 4b is disposed between two adjacent teeth 10a of the magnetic yoke 4a.

The teeth 10a, 10b of the magnetic yokes 4a, 4b are, as stated above, formed so as to cover the outer bevel circumference surface of the truncated conical-shaped permanent magnet 5 with an appropriate distance. Here, the appropriate distance means a distance where the magnetic yokes 4a, 4b can be positioned within the magnetic field generated by the permanent magnet 5. Further, the magnetic yokes 4a, 4b are fixed to the output shaft 2 such that each projecting tip of the respective teeth 10a, 10b of the magnetic yokes 4a, 4b coincides with each boundary between each adjacent N pole and S pole (or each adjacent S pole and N pole) on the permanent magnet 5, under a neutral state where a torque is not applied to the input shaft 1 or the output shaft 2.

Further outside the magnetic yokes 4a, 4b, a smaller and a larger flux condensing rings 8a, 8b (auxiliary soft magnetic materials) are disposed parallel to and equally spaced from the magnetic yokes 4a and 4b, respectively. The smaller flux condensing ring 8a is magnetically connected to the smaller magnetic yoke 4a, so as to induce a magnetic flux from the magnetic yoke 4a. The larger flux condensing ring 8b is magnetically connected to the larger magnetic yoke 4b, so as to induce a magnetic flux from the magnetic yoke 4b. In the respective flux condensing rings 8a, 8b, a plate-shaped flux condensing portion 19a, 19b located closer to each other than other portions are formed. In a gap formed by the flux condensing portions 19a, 19b, the magnetic flux induced by the flux condensing rings 8a, 8b are condensed.

In the gap formed by the flux condensing portions 19a, 19b, two Hall ICs 6 (Hall elements or detectors) are circumferentially inserted parallel to each other. The flux condensing rings 8a, 8b are fixed in a housing (not shown) under the state where the flux condensing rings 8a, 8b are magnetically insulated. The two Hall ICs 6 are fixed in the housing which is not shown. The respective lead wires 7 of the Hall ICs 6 are soldered to a substrate which is not shown. These lead wires 7 serve to supply the power that activates the Hall ICs 6, and to output a detecting result obtained by the Hall ICs 6.

A reason that two Hall ICs 6 are provided is to enable the torque detecting apparatus to cancel a temperature drift and increase the sensitivity, by detecting the magnetic flux in opposite directions, for example. Accordingly, it is not necessary to provide two Hall ICs 6, but just one may be provided.

Figure 4:
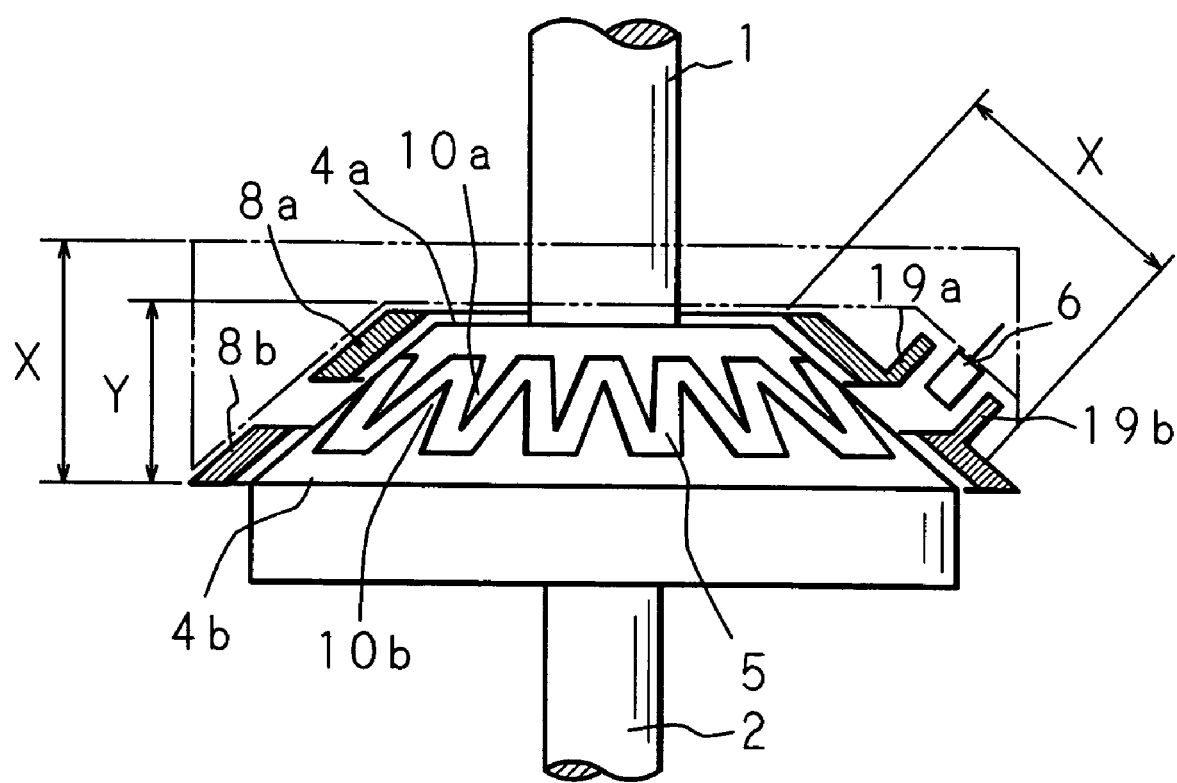
FIG. 4 is a schematic partial cross-sectional view showing the torque detecting apparatus according to the present invention.

FIG. 4 is a schematic partial cross-sectional view showing the torque detecting apparatus according to the present invention. FIG. 4 depicts the same portion of the torque detecting apparatus as that of FIG. 1, in order to explicitly show the features of the torque detecting apparatus according to the present invention in contrast to the conventional one disclosed in Japanese Patent Application Laid Open No.2003-149062. As shown in FIG. 4, in the torque detecting apparatus according to the present invention, the length of the bevel circumference surface of the truncated conical-shaped permanent magnet 5 is substantially the same as the length (height) X of the cylindrical permanent magnet 15 in an axial direction of the input shaft 1 in the conventional torque detecting apparatus shown in FIG. 1. Such configuration allows reducing a length (height) Y of the torque detecting apparatus according to the present invention in an axial direction of the input shaft 1, compared with the length (height) X of the conventional torque detecting apparatus, which uses the cylindrical permanent magnet 15. In the torque detecting apparatus according to the present invention, therefore, even if considering the space occupied by the flux condensing rings 8a, 8b, the volume can be reduced by a portion corresponding to a cross-section indicated by the alternate long and two short dashes line in FIG. 4, and the length (height) in an axial direction of the input shaft 1 can be reduced by an amount of "X−Y".

Figure 5A:
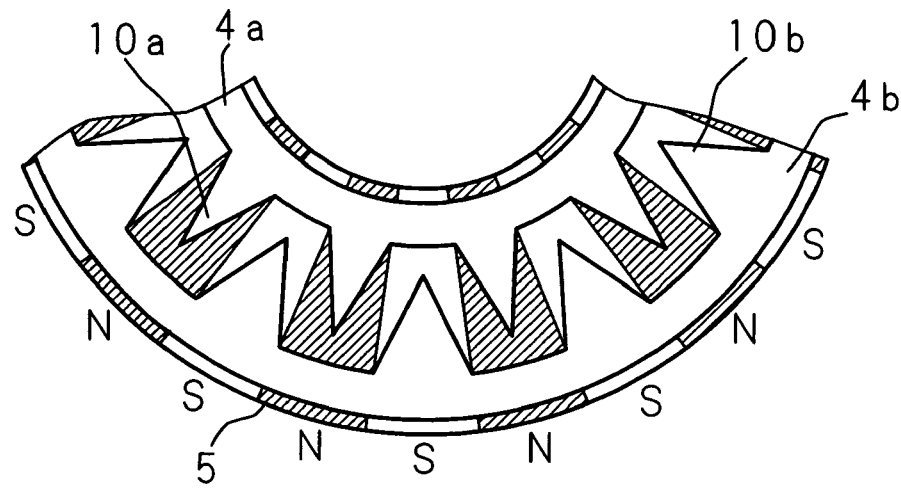
FIG. 5A, FIG. 5B and FIG. 5C are partial plan views showing the positional relation between a truncated conical-shaped permanent magnet and magnetic yokes for explaining an operation of the torque detecting apparatus according to the present invention.
Figure 5B:
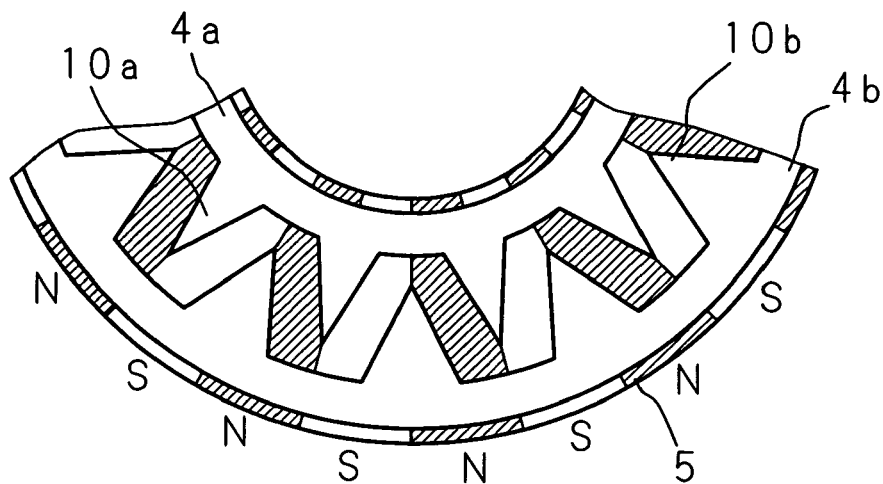
Figure 5C:
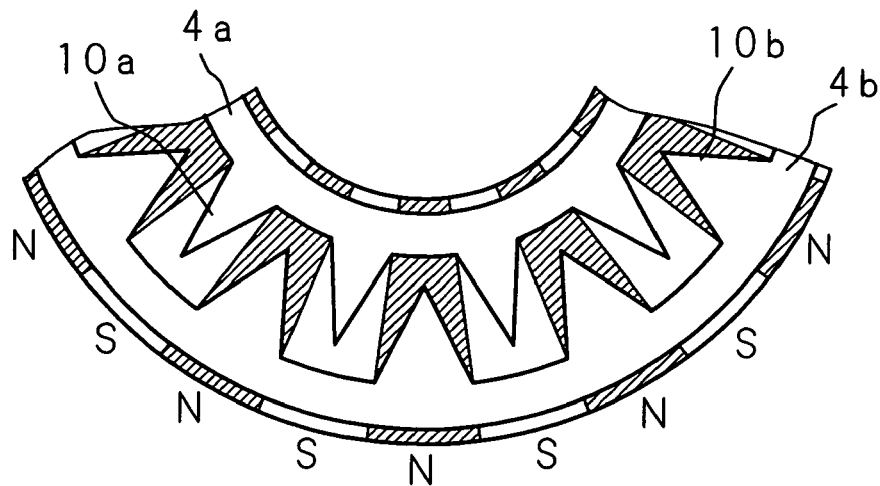

An operation of the torque detecting apparatus according to the present invention configured as above will be described hereunder. FIG. 5A, FIG. 5B and FIG. 5C are partial plan views showing the positional relation between the truncated conical-shaped permanent magnet 5 and the magnetic yokes 4a, 4b for explaining an operation of the torque detecting apparatus according to the present invention. In FIG. 5A to FIG. 5C, the N poles of the permanent magnet 5 are represented by hatched portions, while the S poles of the same are represented by no hatched portions.

When a torque is not applied to the input shaft 1 or the output shaft 2, the respective teeth 10a, 10b of the magnetic yokes 4a, 4b coincide with each boundary between each adjacent N (S) pole and S (N) pole of the permanent magnet 5, as shown in FIG. 5B. Accordingly, with respect to each of the teeth 10a, 10b, since each tooth is formed in an isosceles triangular shape, an area of each tooth opposite to the adjacent N (S) pole and S (N) pole of the permanent magnet 5 becomes equal. Under such a state, a magnetic flux coming into each of the teeth 10a, 10b from the N. pole and going out to the adjacent S. pole becomes equivalent, by which the magnetic yoke 4a and the magnetic yoke 4b both become magnetically neutral state, and therefore a magnetic flux is not generated between the magnetic yokes 4a and 4b.

In contrast, when a torque is applied to either of the input shaft 1 or output shaft 2, torsion of an amount proportional to the magnitude of the applied torque generates on the torsion bar 3. This fact means that relative torsion generates between the input shaft 1 and the output shaft 2. Here, since the permanent magnet 5 is fixed to the input shaft 1 and the magnetic yokes 4a, 4b are both fixed to the output shaft 2, the positional relation between the permanent magnet 5 and the magnetic yokes 4a, 4b changes from the state shown in FIG. 5B.

In this case, while the positional relation between the respective teeth 10a and 10b of the magnetic yokes 4a, 4b remains the same, with respect to each tooth 10a of the magnetic yoke 4a, an area opposite to the N pole of the permanent magnet 5 becomes larger than an area opposite to the adjacent S. pole of the same, as shown in FIG. 5A, for example. Accordingly, in each tooth 10a of the magnetic yoke 4a, an amount of magnetic flux coming from the N. pole of the permanent magnet 5 becomes larger than the magnetic flux going out to the S pole of the same. Likewise, with respect to each tooth 10b of the magnetic yoke 4b, an area opposite to the N pole of the permanent magnet 5 becomes smaller than an area opposite to the adjacent S pole of the same. Accordingly, in each tooth 10b of the magnetic yoke 4b, an amount of magnetic flux coming from the N pole of the permanent magnet 5 becomes smaller than the magnetic flux going out to the S pole of the same.

Under such a state, a magnetic flux from the magnetic yoke 4a toward the magnetic yoke 4b is generated in the gap between the magnetic yokes 4a and 4b, and the density of such magnetic flux becomes greater according to the difference in area between a portion of the N pole opposing each tooth 10a, 10b and a portion of the S pole opposing each tooth 10a, 10b, of the permanent magnet 5.

On the other hand, when a torque is applied to the input shaft 1 or the output shaft 2 in the reverse direction to the foregoing case, torsion of an amount proportional to the magnitude of the applied torque in the reverse direction to the above generates on the torsion bar 3. Accordingly, similarly to the above, the positional relation between the permanent magnet 5 and the magnetic yokes 4a, 4b changes from the state shown in FIG. 5B.

In this case also, while the positional relation between the respective teeth 10a and 10b of the magnetic yokes 4a, 4b remains the same, with respect to each tooth 10a of the magnetic yoke 4a, an area opposite to the N pole of the permanent magnet 5 becomes smaller than an area opposite to the adjacent S. pole of the same, as shown in FIG. 5C, for example. Accordingly, in each tooth 10a of the magnetic yoke 4a, an amount of magnetic flux coming from the N pole of the permanent magnet 5 becomes smaller than the magnetic flux going out to the S pole of the same. Likewise, with respect to each tooth 10b of the magnetic yoke 4b, an area opposite to the N pole of the permanent magnet 5 becomes larger than an area opposite to the adjacent S pole of the same. Accordingly, in each tooth 10b of the magnetic yoke 4b, an amount of magnetic flux coming from the N pole of the permanent magnet 5 becomes larger than the magnetic flux going out to the S pole of the same.

Under such a state, a magnetic flux from the magnetic yoke 4b toward the magnetic yoke 4a is generated in the gap between the magnetic yokes 4a and 4b, and the density of such magnetic flux becomes greater according to the difference in area between a portion of the N pole opposing each tooth 10a, 10b and a portion of the S pole opposing each tooth 10a, 10b, of the permanent magnet 5.

Figure 6:
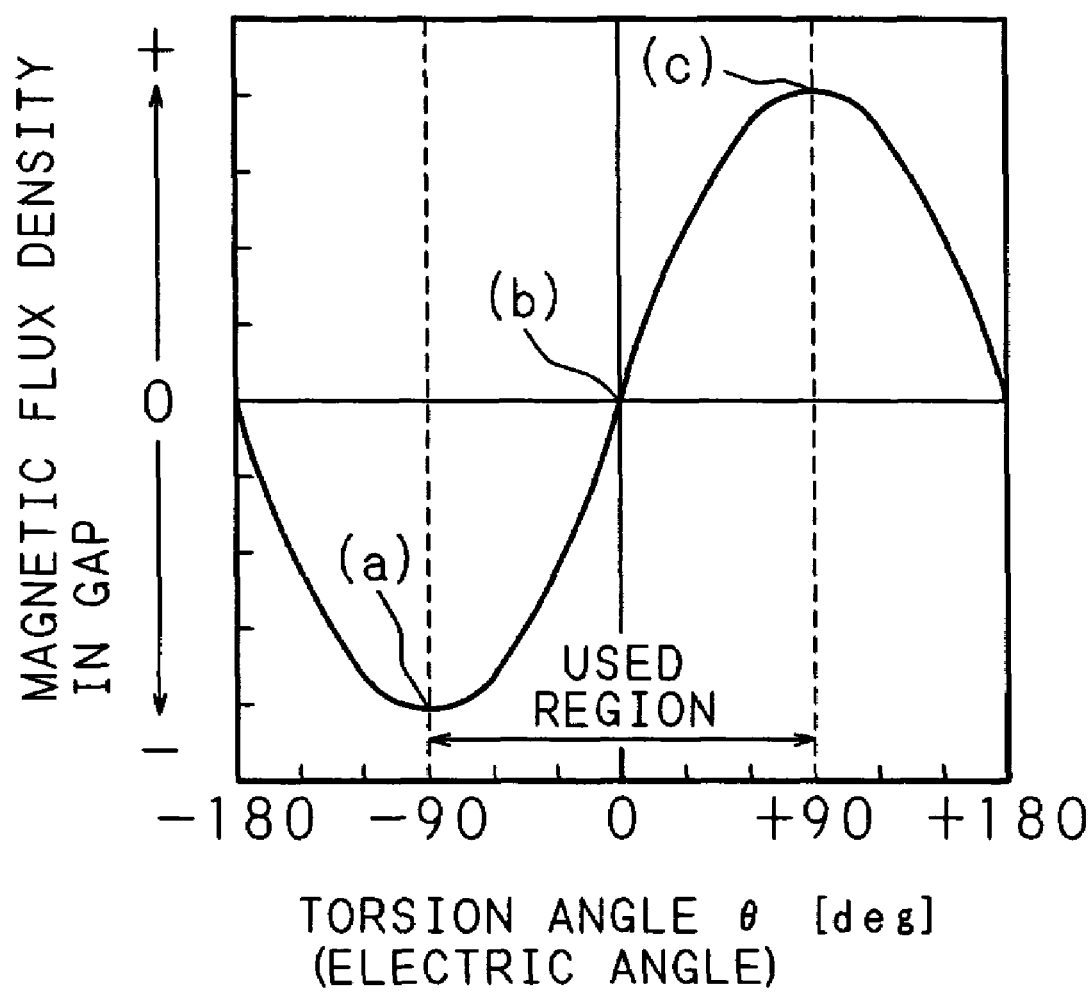
FIG. 6 is a graph showing a relation between a torsion angle generated on a torsion bar and a density of a detected magnetic flux, in the torque detecting apparatus according to the present invention.

When the variation in density of the magnetic flux generated in the gap between the magnetic yokes 4a and 4b is graphically shown with respect to the torsion angle of the torsion bar 3, namely in a range of −180 to +180 electric angles (in mechanical angles, −15 to +15 degrees), the variation is represented by a sine wave as shown in FIG. 6. Here, FIG. 6 is a graph showing a relation between a torsion angle generated on a torsion bar and a density of a detected magnetic flux, in the torque detecting apparatus according to the present invention. It is to be noted, however, that the range in a practical use does not exceed a range from −90 to +90 electric angles, taking the rigidity of the torsion bar 3 into account.

According to the density of the magnetic flux generated in the gap between the magnetic yokes 4a and 4b, the magnetic fluxes generated on the magnetic yokes 4a, 4b are respectively induced by the flux condensing rings 8a, 8b, and concentrated on the flux condensing portions 19a, 19b of the flux condensing rings 8a, 8b. Since two Hall ICs 6, 6 are inserted between the flux condensing portions 19a, 19b, the magnetic fluxes respectively induced by the flux condensing rings 8a, 8b are detected by the two Hall ICs 6, 6. Here, since the flux condensing rings 8a, 8b cover an entire circumference of the magnetic yokes 4a, 4b, the Hall ICs 6, 6 can detect an average of the density of the magnetic fluxes generated along the entire circumference of the magnetic yokes 4a, 4b. The average of the density of the magnetic fluxes detected by the Hall ICs 6, 6 is proportional to the magnitude of the torque applied to the input shaft 1 or the output shaft 2.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds there-of are therefore intended to be embraced by the claims.

What is claimed is:

1. A torque detecting apparatus comprising:
   a permanent magnet fixed to a first shaft;
   a pair magnetic yokes fixed to a second shaft coaxially connected to said first shaft via a connecting rod and disposed within a magnetic field of said permanent magnet to form a magnetic circuit;
   a pair of flux condensing rings magnetically connected to said magnetic yokes so as to induce a magnetic flux from said magnetic yokes, each said flux condensing ring having a flux condensing portion for condensing the induced magnetic flux; and
   a detector for detecting a magnetic flux generated between said magnetic yokes, induced by said pair of magnetic yokes and condensed in the flux condensing portions when a torque is applied to said first shaft or said second shaft;
   whereby the torque applied to said first shaft or said second shaft is detected based on the magnetic flux detected by said detector;
   wherein said permanent magnet is of a truncated conical shape and coaxially fixed to said first shaft,
   a bevel circumference surface of the truncated conical shape of said permanent magnet is magnetized by magnetic poles alternating in a reverse polarity along a circumferential direction at regular intervals,
   said magnetic yokes are opposing said bevel circumference surface of said permanent magnet at a regular interval,
   said magnetic yokes and said flux condensing rings are of a truncated conical shape, and
   said flux condensing rings are disposed parallel to and equally spaced from said magnetic yokes respectively.

2. The torque detecting apparatus as set forth in claim 1, wherein two of said magnetic yokes are provided,
   each of said magnetic yokes is provided with teeth which are symmetrical with respect to a straight line along an axial direction of said first shaft, the number of said teeth being a half of the number of said magnetic poles magnetized on said bevel circumference surface of said permanent magnet,
   when torque is not applied to both said first shaft and said second shaft, a center of said respective teeth of one of said magnetic yokes is positioned on a boundary between a N (or S) pole and a S (or N) pole magnetized on said bevel circumference surface of said permanent magnet, and
   a center of said respective teeth of said other magnetic yokes is positioned on a boundary between a S (or N) pole and a N (or S) pole magnetized on said bevel circumference surface of said permanent magnet.

* * * * *

UNITED STATES PATENT AND TRADEMARK OFFICE
CERTIFICATE OF CORRECTION

| | |
|---|---|
| PATENT NO. | : 7,387,034 B2 |
| APPLICATION NO. | : 11/213032 |
| DATED | : June 17, 2008 |
| INVENTOR(S) | : Toshiharu Ishihara et al. |

It is certified that error appears in the above-identified patent and that said Letters Patent is hereby corrected as shown below:

On the Title Page Item (73)

Please delete "KOYO SEIKO CO., LTD. and FAVESS CO., LTD." and insert --JTEKT CORPORATION--

Signed and Sealed this

Nineteenth Day of August, 2008

JON W. DUDAS
*Director of the United States Patent and Trademark Office*